UNITED STATES PATENT OFFICE.

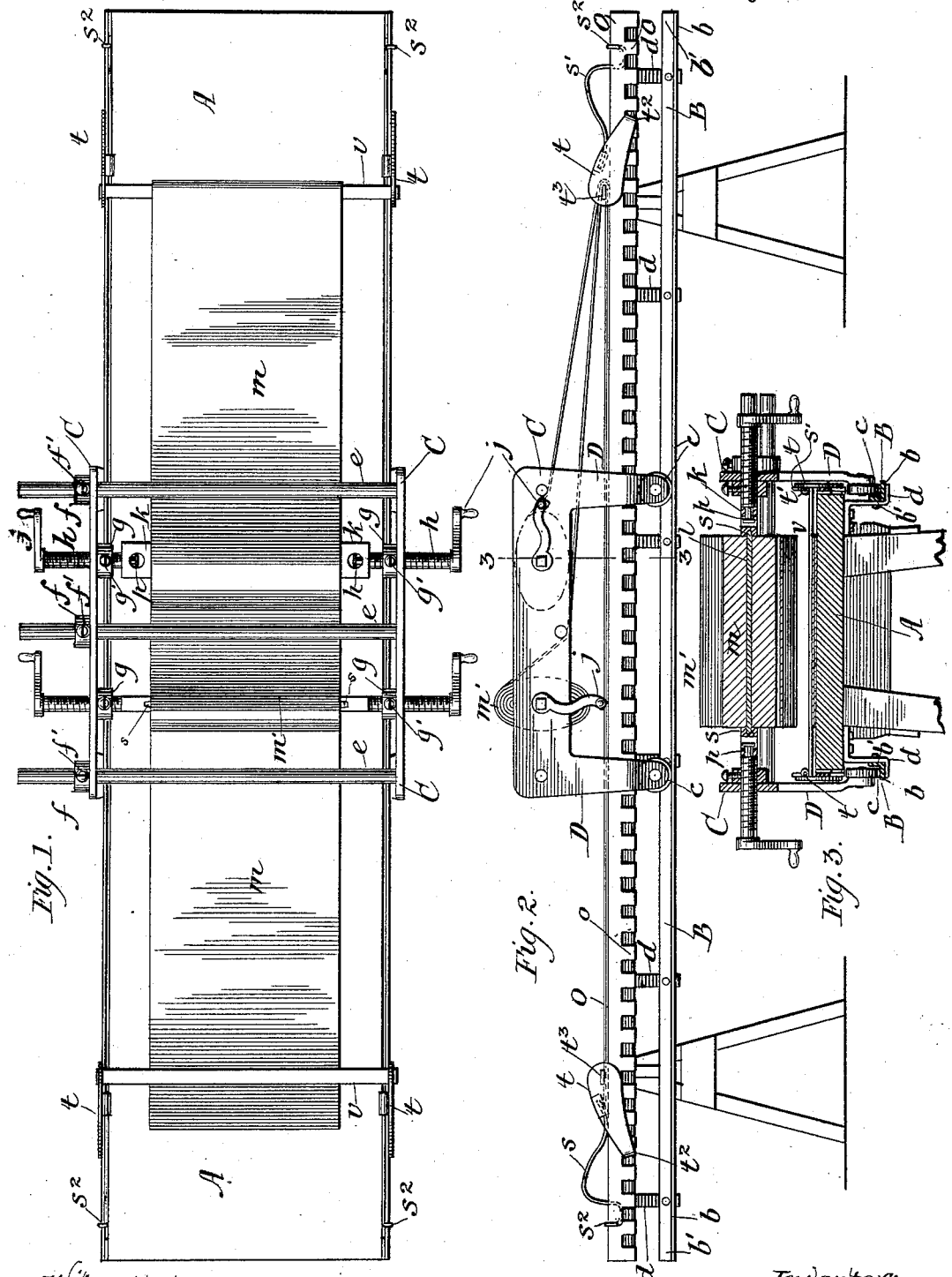

HERMAN A. BINDEMAN, OF CHICAGO, ILLINOIS.

CLOTH-PILING MACHINE.

SPECIFICATION forming part of Letters Patent No. 431,321, dated July 1, 1890.

Application filed January 6, 1890. Serial No. 335,978. (No model.)

*To all whom it may concern:*

Be it known that I, HERMAN A. BINDEMAN, a citizen of the United States, residing at the city of Chicago, in the county of Cook and State of Illinois, have invented a new and useful Cloth-Unfolder, of which the following is a specification.

My invention relates to improvements in machines for unfolding cloth; and the object of my invention is to provide means for carrying a roll or bolt of cloth back and forth while the cloth is being unwound or unfolded from such roll or bolt and laid upon the table or bench for the purpose of being cut. I attain this object by the mechanism illustrated in the accompanying drawings, in which—

Figure 1 represents a top view of my unfolder with the table or bench upon which the cloth is laid. Fig. 2 represents a side elevation of the machine and table. Fig. 3 is a vertical section of the carriage on the line 3 3, Fig. 2, looking toward the point $m'$.

Similar letters refer to similar parts throughout the several views.

A A represent a table or bench, of any desired length or width, supported on legs in the usual manner. To this table, on each side and longitudinally thereof, is attached a side rail B B, of metal or other suitable material, composed of a horizontal flange $b$ for the support of the small wheels $c\ c$ of the carriage and a vertical flange $b'$, by which the said rail is secured to the angle-irons or brackets $d\ d$, which are attached to the table and support the side rails B B.

The carriage is composed of two side pieces C C, each having two legs D D, provided with the small wheels $c\ c$. The side pieces C C are attached to each other by the cross bars or rods $e\ e\ e$. These cross-bars may project beyond the side pieces on one or both sides of the carriage, and the side piece may be made to slide thereon, so as to permit the adjustment of the carriage to fit tables of different widths. The sides may be held in the proper adjustment on the cross-bars by means of the metal collars $f\ f$, encircling the cross-bars, and set-screws $f'\ f'$. In each of the side pieces C is a circular aperture, and rigidly attached to the inside of each of the side pieces is a nut $g$, whose threaded aperture corresponds with the aperture in the side piece. Through this aperture and nut passes a threaded bolt $h$ on each side of the carriage, and to each of said threaded bolts, outside of the carriage, is attached a crank $j$. The threaded bolt has a pin $p$ at the inner end thereof. A plate or block $k$, having in one end thereof an aperture to receive the pin $p$ on the end of the threaded bolt and a larger aperture in the center thereof, is pivoted upon the pin $p$ at the end of the threaded bolt $h$. The aperture in the center of the block $k$ permits the end of the pin $p$ to be spread in such manner as to retain the said block $k$ upon the pivot or pin $p$. At its opposite end the block $k$ has jaws $s$, preferably beveled, so as to tightly hold the wooden bar $l$, around which the cloth $m$ is folded or wrapped. Two racks O, one attached to each side of the table, extend longitudinally of the table and have square teeth $o\ o$ therein. Four arms $t\ t$, shaped as shown and provided with hooks at their ends $t^2$, may be detachably hooked around the teeth $o$. In the end of each of the arms $t$ opposite the end $t^2$ is an oblong aperture $t^3$, through which may be thrust the flat metal bar $v$. A spring $s'$, bent in the form shown, is held at one end between the toothed rack O and the side of the table-top, and is detachably hooked over said toothed rack, as shown at $s^2$. At its other end the spring $s'$ enters the perforation in the lug $t'$ on the inside of the arm $t$ and exerts a pressure upon said arm $t$.

In operation the threaded bolts $h\ h$ are screwed through the nuts $g\ g$ by means of the cranks $j$ until the jaws $s\ s$ firmly grasp the usually-beveled ends of the flat wooden bar upon which the cloth is wrapped. The threaded bolts are held in this position by the set-screws $g'\ g'$ in the nuts $g\ g$. As the blocks $k$ are then free to move on their pivots $p\ p$, the bolt of cloth will thus be permitted to rotate freely within the carriage. One end of the cloth is then placed under the bar $v$, which is passed through the aperture $t^3$ in the metal arm $t$, and is thereby firmly held against the cloth upon the table by the pressure of the springs $s'\ s'$ in the perforated lugs $t'\ t'$. The carriage is then moved away from the said bar $v$, and one end of the cloth being thus firmly held to the table by the said bar $v$ the cloth will be unfolded or unwound from the bolt, which will be rotated by moving the carriage. When the opposite end of the table is reached by the carriage, the bar $v$ at such opposite end is placed through the oblong apertures $t^3\ t^3$ of the arms $t$ and upon the cloth on the table and held on the cloth in like manner as at the other end of the table by the spring $s'$. The carriage is then moved back from the last-mentioned bar $v$ holding the cloth. This operation of unfolding the cloth is repeated, the carriage being moved back and forth until all the cloth is unfolded or unwound and nicely laid flat upon the table for cutting.

The carriage may contain one or more sets of the mechanism, as shown, for unfolding one or more bolts of cloth at the same time. In the drawings two sets are shown, $m'$ being the cloth upon the second set.

The arms $t\ t$ and the springs $s'$ being detachable, the metal pieces may be hooked into any of the teeth in the toothed rack-bar O, and the springs $s'$ will likewise rest against any part of the said toothed rack-bar, so that the cloth may be laid upon the table in any lengths desired.

What I claim as new, and desire to secure by Letters Patent, is—

1. In a machine for unfolding cloth, the combination, with the table A, having the rails B and the racks O, of the cloth-supporting carriage running on said rails, the bars $v$, the arms $t$, having hooks $t^2$ to engage the teeth of said racks, and the holding-springs $s'$.

2. In a machine for unfolding cloth, the combination, with the table A, provided with the brackets $d$, of the flanged rails B, supported by said brackets below said table, the cloth-supporting carriage running on said rails, the racks O, the bars $v$, the arms $t$, having hooks $t^2$ to engage the teeth of said racks, and the springs $s'$.

3. In a machine for unfolding cloth, the combination, with the table A, having the rails B, of a cloth-supporting carriage consisting of the side pieces C, legs D, wheels $c$, and cross bars or rods $e$, said carriage being furnished with screws $h$, having plain portions or pins $p$, and the blocks $k$, pivoted on said pins and having jaws $s$ to engage the bar $l$ of the cloth-bolt.

HERMAN A. BINDEMAN.

Witnesses:
EDNA DORR,
G. F. LANAGHEN.